UNITED STATES PATENT OFFICE.

HERMANN SCHULTZE, OF GRIESHEIM-ON-THE-MAIN, GERMANY, ASSIGNOR TO CHEMISCHE FABRIK GRIESHEIM ELECTRON, OF FRANKFORT-ON-THE-MAIN, GERMANY.

MANUFACTURE OF CHLORINATED COMPOUNDS OF LIME.

No. 888,122.　　　Specification of Letters Patent.　　　Patented May 19, 1908.

Application filed November 15, 1906. Serial No. 343,604.

*To all whom it may concern:*

Be it known that I, HERMANN SCHULTZE, a subject of the German Emperor, and a resident of Griesheim-on-the-Main, Germany, have invented certain new and useful Improvements in the Manufacture of Chlorinated Compounds of Lime, of which the following is a specification.

It is well known that the dry compound of lime and chlorin at present on the market does not contain more than forty per cent. of active chlorin the remaining sixty per cent. being useless inert matter. All attempts previous to this invention, to produce a chlorinated compound of lime containing a much higher percentage of active chlorin have failed as, in the usual process based on bringing dry slaked lime into contact with chlorin, the lime is not capable of taking up more than the aforesaid amount of chlorin.

According to this invention a dry chlorinated compound of lime is obtained in an efficient and economical manner, the said compound having a content of active chlorin of from eighty to ninety per cent.

Instead of starting, as is usual, from dry slaked lime, milk of lime is taken and through this, while being stirred, chlorin is passed until the lime is almost saturated with chlorin. The solution of chlorinated lime thus obtained is filtered and then so evaporated that there is the least possible decomposition of the calcium hypochlorite. This can be effected, for instance, by concentrating the solution *in vacuo* at a low temperature or, (as the rate at which decomposition takes place is a function of time) by effecting the evaporation rapidly at a high temperature. The calcium hypochlorite is precipitated in a crystalline state and can be easily separated by suction and washing out.

Kingzett, in 1875, obtained this compound in small amounts (*Chemical News* 31 and 32) by evaporating the solution of chlorinated lime over sulfuric acid in a vacuum desiccator thereby obtaining calcium hypochlorite in the form of crystals containing about 47 per cent. of active chlorin, but the crystals he obtained were very unstable, and the experiment, though interesting from a scientific point of view was useless for practical purposes. Kingzett stated that he was not in position to give practical process for the manufacture of the crystals and Lunge in his *Handbuch der Soda-Industrie*, II edition, Vol. 3, page 371, (1896,) expressed himself to the same effect. (See also his remark re Kingzett in the *Chemical News* 46, page 148, for 1882, and also the remarks of Winteler on Kingzett's calcium hypochlorite in the *Zeitschrift fur Anorganische Chemie* for 1903, Vol. 93, page 182.)

The unstable character of hypochlorites is found to be attributable to their contents of moisture and water of crystallization and the crystals obtained by evaporation can be rendered stable, if, after their evaporation from the mother-lye and suitable washing out, they be deprived entirely of their moisture and of the greater part of their water of crystallization by drying quickly at a high temperature of from 40 to 50 degrees centigrade, or at a low temperature, preferably *in vacuo*, a dry product being thus obtained which is more stable than the chlorinated lime produced in the usual manner.

According to this invention it is possible to produce a chlorinated compound of lime containing much more than the ordinary amount of active chlorin the said compound, with hydrochloric acid evolving from 80 to 90 per cent. of its weight of active chlorin according to the following equation:

$$Ca(OCl)_2 + 4HCl = 2Cl_2 + CaCl_2 + 2H_2O.$$

One molecule of this compound can give off 4 atoms of active chlorin. The compound also has the following advantages:—It dissolves in water without coloration, the solution being almost clear, and therefore no clarifying apparatus is required at the place where the new compound is used, and it does not yield any troublesome residual product. Exposed to the air it does not become damp like ordinary chlorinated lime. It is remarkably pure, uniform, and satisfactory in use, and its bleaching power is excellent, as it is possible to evolve therefrom, as required, free chlorin, free hypochlorous acid, or oxygen, while there is economy in freight, packing and storing.

The product has the formula of $Ca(OCl)_2 +$ small quantities of $CaCl_2$, $Ca(ClO_3)_2$, $CaCO_3$, $Ca(OH)_2$ and $H_2O$; an analysis of the compound giving the following results:

83.7% $Ca(OCl)_2$ = 83.1% active chlorin
5.8% $CaCl_2$
0.6% $Ca(ClO_3)_2$
1.1% $CaCO_3$
3.8% $Ca(OH)_2$
5.0% $H_2O$ 100.0

Having thus described my invention what I claim is:

1. The herein described process of manufacturing a dry and permanent chlorinated compound of lime, consisting in evaporating a solution of chlorid of lime, separating the crystals of calcium hypochlorite so produced from the liquid, and removing all free moisture and part of the water of crystallization by suitably drying the crystals.

2. The herein described process of manufacturing a dry and permanent chlorinated compound of lime, which consists in evaporating a solution of chlorid of lime, taking care that there is the least possible decomposition of the calcium hypochlorite, separating the crystals so produced from the liquid and quickly drying the said crystals.

3. The herein described process of manufacturing a dry and permanent chlorinated compound of lime, which consists in evaporating a solution of chlorid of lime, taking care that there is the least possible decomposition of the calcium hypochlorite, separating the crystals so produced from the liquid and quickly drying the said crystals at a high temperature.

In testimony whereof I have signed my name to this specification in the presence of two subscribing witnesses.

HERMANN SCHULTZE.

Witnesses:
FRANZ HASSLACHER,
ERWIN DIPPELY.